United States Patent
Srinivas et al.

(10) Patent No.: US 8,537,778 B1
(45) Date of Patent: Sep. 17, 2013

(54) METHODS AND SYSTEMS FOR INITIATING A HANDOFF BASED ON EV-DO DRCLOCK

(75) Inventors: Shilpa Kowdley Srinivas, Herndon, VA (US); Bhagwan Khanka, Lenexa, KS (US); Anoop K. Goyal, Overland Park, KS (US); Hemanth Balaji Pawar, Herndon, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 613 days.

(21) Appl. No.: 12/491,556

(22) Filed: Jun. 25, 2009

(51) Int. Cl.
*H04W 4/00* (2009.01)

(52) U.S. Cl.
USPC ............................................ 370/331; 455/436

(58) Field of Classification Search
USPC ......... 370/328–329, 331–336, 338, 342–343; 455/434, 436–443
See application file for complete search history.

(56) References Cited

U.S. PATENT DOCUMENTS

| | | | |
|---|---|---|---|
| 7,457,623 B2 * | 11/2008 | Naghian et al. | 455/439 |
| 7,583,637 B2 * | 9/2009 | Lau et al. | 370/332 |
| 7,715,347 B2 * | 5/2010 | Yoon et al. | 370/332 |
| 7,725,122 B1 * | 5/2010 | Balakrishnan et al. | 455/522 |
| 7,953,048 B2 * | 5/2011 | Yoon et al. | 370/335 |
| 8,160,629 B2 * | 4/2012 | Mate et al. | 455/522 |
| 8,218,506 B2 * | 7/2012 | Yokota | 370/332 |
| 2004/0087276 A1 * | 5/2004 | Attar et al. | 455/63.4 |
| 2008/0062925 A1 * | 3/2008 | Mate et al. | 370/331 |
| 2008/0170548 A1 * | 7/2008 | Suh et al. | 370/331 |
| 2009/0176493 A1 * | 7/2009 | Yokota | 455/436 |
| 2010/0222059 A1 * | 9/2010 | Pani et al. | 455/436 |

* cited by examiner

*Primary Examiner* — Kevin Mew

(57) ABSTRACT

Methods and systems are provided for initiating a handoff of an access terminal based on EV-DO DRCLock. In an embodiment, an access node (i) makes a determination that a DRCLock is set for at least a threshold number of coverage areas in an active set for an access terminal operating on a first carrier in a first wireless network, and (ii) in response to making the determination, initiates a handoff of the access terminal from the first carrier to at least one of (a) a second carrier and (b) a second wireless network.

26 Claims, 2 Drawing Sheets

METHODS AND SYSTEMS FOR INITIATING A HANDOFF BASED ON EV-DO DRCLOCK

BACKGROUND

Many people use mobile stations, such as cell phones and personal digital assistants, to communicate with cellular wireless networks, which typically provide communication services such as voice, text messaging, and packet-data communication to these mobile stations. The mobile stations and networks typically communicate with each other over a radio frequency (RF) air interface according to a wireless protocol such as 1xRTT CDMA, EV-DO, WiMax, etc.

Mobile stations typically conduct these wireless communications with one or more base transceiver stations (BTSs), each of which send communications to and receive communications from mobile stations over the air interface. Each BTS is in turn communicatively connected with an entity known as a base station controller (BSC), which (a) controls one or more BTSs and (b) acts as a conduit between the BTS(s) and one or more switches or gateways, such as a mobile switching center (MSC) and/or packet data serving node (PDSN), which may in turn interface with one or more signaling and/or transport networks.

As such, mobile stations can typically communicate with one or more endpoints over the one or more signaling and/or transport networks from inside one or more coverage areas (such as cells and/or sectors) of one or more BTSs, via the BTS(s), a BSC, and an MSC and/or PDSN. In typical arrangements, MSCs interface with the public switched telephone network (PSTN), while PDSNs interface with one or more core packet-data networks and/or the Internet.

OVERVIEW

A mobile station may engage in packet-data communication over one or more packet-data networks with one or more different types of endpoints, some examples of which include other mobile stations, landline phones, conference servers, gateways, etc. In the case of landline phones, a media gateway may reside between a packet-data network and a circuit-switched network such as the PSTN. For simplicity of explanation, examples involving mobile stations communicating with one respective endpoint over a packet-data network via one BTS, one BSC, and one PDSN may be described herein; however, the present disclosure could just as well be applied to more complex examples, perhaps involving communication sessions between mobile stations and multiple endpoints, such as may be the case in a conference call.

Furthermore, a given instance of packet-data communication engaged in by a mobile station may be of any type. One popular type is Voice over IP (VoIP), which may have a user experience that is similar to voice calls conducted over the PSTN via a BTS, a BSC, and an MSC. VoIP calls (i.e. sessions) may also or instead take the form of push-to-talk (PTT) sessions, known to those in the art. In general, as used herein, "VoIP" encompasses any type of voice-over-packet communication that may be engaged in by mobile stations. More generally, the methods and systems described herein may be applied to any type of data communication, though doing so with respect to latency-sensitive types such as VoIP, video-conferencing, streaming media, etc. may yield the greatest dividends with respect to user satisfaction.

When a base station—and a wireless network in general—provides packet-data service (e.g. VoIP service) to a given mobile station, the base station is providing at least two services to that mobile station. The first is wireless service over the air interface, and the other is transport service (i.e. connectivity) over one or more packet-data networks, such as direct transport service over the service provider's privately-operated core packet-data network, as well as indirect transport service over a public packet-data network such as or including the Internet.

Note that, in contexts where wireless service is provided according to a protocol known as EV-DO (perhaps according to IS-856, Revision 0 and/or IS-856, Revision A, both of which are hereby incorporated herein by reference in their entirety), mobile stations are often referred to as access terminals, and BSCs are often referred to as RNCs (radio network controllers). Furthermore, a combination of an RNC and one or more BTSs is often referred to as an access node. This terminology will be adopted for the balance of this written description, though again for illustration and not to limit the described embodiments to any particular protocol.

An EV-DO network may include a plurality of access nodes, each providing one or more wireless coverage areas—for example, one or more sectors. When an access terminal is positioned in a sector, it can communicate over the air interface with the access node, and in turn over one or more circuit-switched and/or packet-switched signaling and/or transport networks to which the access node provides access. The access node and the access terminal conduct these communications over a frequency known as a carrier. An access node may provide service in a sector on one carrier, or on more than one carrier. A given instance of a given carrier in a given sector may be referred to herein as a "sector/carrier."

The serving network may provide service to an access terminal over a plurality of sectors. The set of sectors currently providing service to the access terminal is known as the "active set." The access terminal will typically communicate with each sector in the active set on the same carrier—that is, the access terminal will typically use the same frequency to communicate with each sector in the active set.

A "soft handoff" occurs when a new sector is added to the active set and/or when a sector currently in the active set is removed from the set. A "hard handoff" occurs when service is to be provided over a new carrier (i.e., when service is to be provided over a different frequency). A hard handoff could occur on the same network—i.e., to a different carrier on that network. A hard handoff could also be a handoff to a different network—for example, a CDMA network, a WiMAX network, a Wi-Fi network, or perhaps another EV-DO network. And other examples are possible.

As known to those of skill in the art, in EV-DO networks, access terminals use a reverse-link channel known as the DRC channel to request forward-link service from a particular network sector. Typically, an access terminal will specify the sector (or coverage area, more generally) from which the access terminal is requesting forward-link service by transmitting a particular value known as a DRC cover in the reverse-link DRC channel, where the DRC cover sent by the access terminal indicates a particular sector. Incidentally, the access terminal also includes data in the reverse-link DRC channel that indicates a particular data rate or particular packet-transmission format, depending on the implemented release or revision of IS-856.

In any event, upon receiving a request for forward-link service (i.e. a DRC request) from an access terminal via the reverse-link DRC channel, a given EV-DO network sector may grant the request and provide forward-link service, in which case the access terminal receives forward-link service from that sector until the access terminal selects another sector, powers down, ceases communication, and/or some other event occurs. If, however, the sector (or more generally perhaps, the access node) determines that the requested sector is not able or willing to provide forward-link service to the access terminal, the sector typically transmits a value to the access terminal known as a DRCLock. In current implementations, the DRCLock is sent when a potential serving sector determines that it is not properly receiving (e.g. cannot properly decode) the reverse-link DRC channel from the access terminal, and thus concludes that it is not a good candidate to provide forward-link service to the access terminal. Some possible causes of a DRCLock needing to be set are high reverse noise on a sector/carrier, weak reverse-link transmissions from an access terminal, fading conditions, improper link imbalance, etc.

Essentially, then, the DRCLock is a message from a sector to an access terminal, informing the access terminal that, at least for the time being, the sector is not an option for providing forward-link service to the access terminal. The DRCLock typically takes the form of a bit, where one of the two possible values (referred to herein as the DRCLock being "set") indicates that the sector is not an option for providing forward-link service to the access terminal, and where the other of the two possible values (referred to herein as the DRCLock being "clear" or "cleared") indicates that the sector is an option for the access terminal. In response to detecting that a sector has set the DRCLock for an access terminal, the access terminal typically points its DRC channel at another sector (i.e. transmits a DRC cover corresponding to another sector). The access terminal may then periodically check whether the first sector has cleared its DRCLock for that access terminal and, if so, point its DRC cover back at that first sector.

Note that it is the sectors in a given access terminal's active set that will evaluate whether they are able to properly receive DRC transmissions from that access terminal: if a given sector is not, that sector will set a DRCLock for that access terminal and later reevaluate.

In current implementations, an access terminal may continue to communicate with the active set over the same carrier even though many sectors in the active set have set a DRCLock for that access terminal. This may cause significant service disruption for the access terminal because there are fewer sectors in the active set that can provide service to the access terminal over the current carrier. A high number of sectors in the active set of a given access terminal on a carrier having a DRCLock set at that time may be indicative of poor conditions for that access terminal communicating over that carrier at that time.

Among the focuses of the present invention is for an entity such as an access node or an access terminal (i) to make a determination that a DRCLock is set for at least a threshold number of coverage areas in an active set for an access terminal operating on a first carrier in a first wireless network, and (ii) in response to making the determination, to initiate a handoff of the access terminal from the first carrier to at least one of (a) a second carrier and (b) a second wireless network.

In an exemplary embodiment, the threshold number may be a percentage of coverage areas that have set a DRCLock. Additionally or alternatively, the threshold number may be a fixed number of coverage areas. In another embodiment, the threshold number may be the total number of coverage areas in the active set less a fixed number of coverage areas. Those having skill in the art will recognize that the threshold number may be any suitable number, combination of numbers, percentage, ratio, etc.

In an exemplary embodiment, initiating the handoff may comprise initiating a handoff of the access terminal from the first carrier to a second carrier in the first wireless network. In another embodiment, initiating the handoff may comprise initiating a handoff from the first carrier in the first wireless network to a second carrier in a second wireless network. Additionally or alternatively, initiating a handoff may comprise initiating a handoff of the access terminal from the first wireless network to a second wireless network. Those having skill in the art will recognize that initiating the handoff may comprise any suitable combination of initiating a handoff to a second carrier and/or a second wireless network.

In an exemplary embodiment, the first wireless network may be an EV-DO network. In another exemplary embodiment, the access terminal may be a dual-mode access terminal, and the second wireless network may be a CMDA network, a WiMAX network, or a Wi-Fi network. Those having skill in the art will recognize, however, that the recited methods and apparatuses can handoff away from and handoff to any suitable network.

And it should be noted that the above overview is intended to be illustrative and not limiting. Additional and/or different features may be present in some embodiments. And any description of an access node, access terminal, or other network element operating according to any particular protocol is by way of example and not limitation; any suitable wireless protocol(s) may be used, such as but not limited to 1 xRTT CDMA, EV-DO, TDMA, AMPS, GSM, GPRS, UMTS, EDGE, WiMax (e.g. IEEE 802.16), LTE, microwave, satellite, MMDS, Wi-Fi (e.g. IEEE 802.11), Bluetooth, infrared, and/or any other now known or later developed.

BRIEF DESCRIPTION OF THE DRAWINGS

Various exemplary embodiments are described herein with reference to the following drawings, wherein like numerals denote like entities.

DETAILED DESCRIPTION OF THE DRAWINGS

1. Exemplary Architecture

Figure 1:
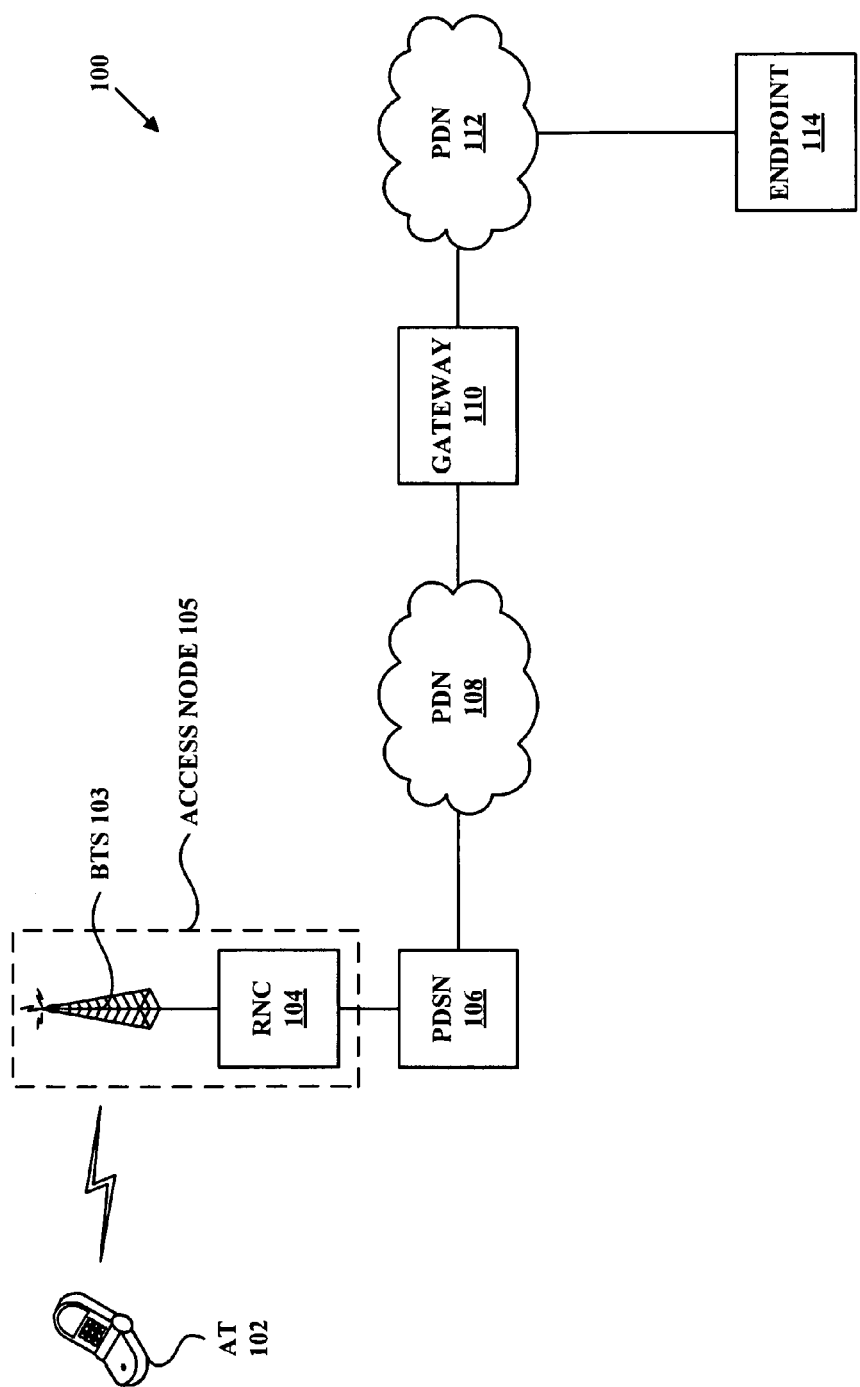
FIG. 1 is a simplified block diagram of a communication system, in accordance with exemplary embodiments.

FIG. 1 is a simplified block diagram of a communication system, in accordance with exemplary embodiments. It should be understood that this and other arrangements described herein are set forth only as examples. Those skilled in the art will appreciate that other arrangements and elements (e.g., machines, interfaces, functions, orders, and groupings of functions, etc.) can be used instead, and that some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. Various functions may be carried out by a processor executing instructions stored in memory.

As shown in FIG. 1, a communication system 100 includes an access terminal (AT) 102, an access node 105 (shown as comprising a BTS 103 and an RNC 104), a PDSN 106, a packet-data network (PDN) 108, a gateway 110, a PDN 112, and an endpoint 114. Note that additional entities not depicted in FIG. 1 could be present as well. As an example, there could be more than one access terminal in communication with access node 105 and/or more than one BTS in access node 105; also, there could be additional entities in communication with PDN 108 and/or PDN 112. Also, there could be one or more routers, switches, other devices and/or networks making up at least part of one or more of the communication links.

Access terminal 102 may be any device arranged to carry out the access-terminal functions described herein, and may include a user interface, a wireless-communication interface, a processor, and data storage comprising instructions executable by the processor for carrying out those access-terminal functions. The user interface may include buttons, a touchscreen, a microphone, and/or any other elements for receiving inputs from users, as well as a speaker, one or more displays, and/or any other elements for communicating outputs to users.

The wireless-communication interface may comprise an antenna and a chipset for communicating with one or more base stations over an air interface. As an example, the chipset could be one suitable for engaging in EV-DO communications, including IS-856, Rel. 0 and/or IS-856, Rev. A communications. The chipset or wireless-communication interface in general may also be able to communicate with a 1xRTT CDMA network, a Wi-Fi (IEEE 802.11) network, and/or one or more additional types of wireless networks. The processor and data storage may be any suitable components known to those of skill in the art. As examples, access terminal 102 could be or include a cell phone, a PDA, a computer, a laptop computer, a hybrid IS-2000/IS-856 device, and/or a multi-mode Wi-Fi/cellular device.

BTS 103 may be any one or any combination of network elements arranged to carry out the BTS functions described herein, and may include a communication interface, a processor, and data storage comprising instructions executable by the processor to carry out those BTS functions. The communication interface may include one or more antennas and chipsets or other components for providing one or more coverage areas such as cells or sectors according to a protocol such as CDMA, EV-DO, WiMax, or any other suitable protocol. The communication interface may also include a wired or wireless packet-data interface (which may be characterized as a backhaul connection), such as an Ethernet interface, for communicating with RNC 104.

RNC 104 may be any one or any combination of network elements arranged to carry out the RNC functions described herein. As such, RNC 104 may include a communication interface, a processor, and data storage comprising instructions executable by the processor to carry out those RNC functions. The communication interface may include a wired or wireless packet-data interface (which may be characterized as a backhaul connection), such as an Ethernet interface, for communicating directly or over one or more networks with PDSN 106. In general, RNC 104 functions to control one or more BTSs, and to serve as a conduit between the one or more BTSs and PDSN 106, enabling access terminals to communicate over PDN 108 and perhaps beyond.

Note that access node 105 may comprise BTS 103 and RNC 104, and may comprise one or more additional BTSs as well. In general, access node 105 provides wireless service to access terminals over an air interface, and uses a backhaul connection to provide transport service over PDN 108 (or perhaps PDN 108 and PDN 112) to those access terminals. PDSN 106 may be any networking server or other device arranged to carry out the PDSN functions described herein. PDSN 106 may include a communication interface, a processor, and data storage comprising instructions executable by the processor for carrying out those PDSN functions. The communication interface may include a wired packet-data interface such as an Ethernet interface for communicating with access node 105 and/or over PDN 108. Note that PDSN 106 may, instead or in addition, comprise a wireless-communication interface for communicating with access node 105 and/or over PDN 108. Note also that PDSN 106 may use the same interface or separate interfaces for communicating with access node 105 and for communicating over PDN 108. PDSN 106 may generally function to provide access node 105 with access to PDN 108, and vice versa.

Each of PDN 108 and PDN 112 may include one or more wide area networks, one or more local area networks, one or more public networks such as the Internet, one or more private networks, one or more wired networks, one or more wireless networks, and/or one or more networks of any other type. Devices in communication with PDN 108 and/or PDN 112 may exchange data using a packet-switched protocol such as IP, and may be identified by an address such as an IP address. In this example, PDN 108 is the service provider's privately-operated IP network (where the service provider may operate at least access node 105 and PDSN 106), while PDN 112 is the Internet. However, this is for illustration and not by way of limitation. In some embodiments, PDSN 106 may connect directly to the Internet, in which case PDN 108 and gateway 110 may not be necessary. And other configurations are certainly possible as well.

Gateway 110 may be any networking server or other device arranged to carry out the gateway functions described herein. Thus, gateway 110 may include a communication interface, a processor, and data storage comprising instructions executable by the processor for carrying out those gateway functions. The communication interface may include a wired packet-data interface, such as an Ethernet interface, for communicating over PDN 108 and/or PDN 112. Note that gateway 110 may, instead or in addition, comprise a wireless-communication interface for communicating over PDN 108 and/or PDN 112. Gateway 110 may use the same interface or separate interfaces for communicating over PDN 108 and/or PDN 112. Gateway 110 may generally function to provide PDN 108 and PDN 112 with connectivity to each other.

Endpoint 114 may be any device arranged to carry out the endpoint functions described herein. As such, endpoint 114 may include a (wired and/or wireless) communication interface, a processor, and data storage comprising instructions executable by the processor for carrying out those endpoint functions. Endpoint 114 may be or include a media gateway (perhaps connected to the PSTN), a packet-based telephone, a personal computer, a PDA, a mobile station, an access terminal, a PTT server, a call server, and/or any other type of device capable of functioning as an endpoint of a VoIP—or other type of packet-data-communication—session in accordance with various embodiments.

2. Exemplary Operation

Figure 2:
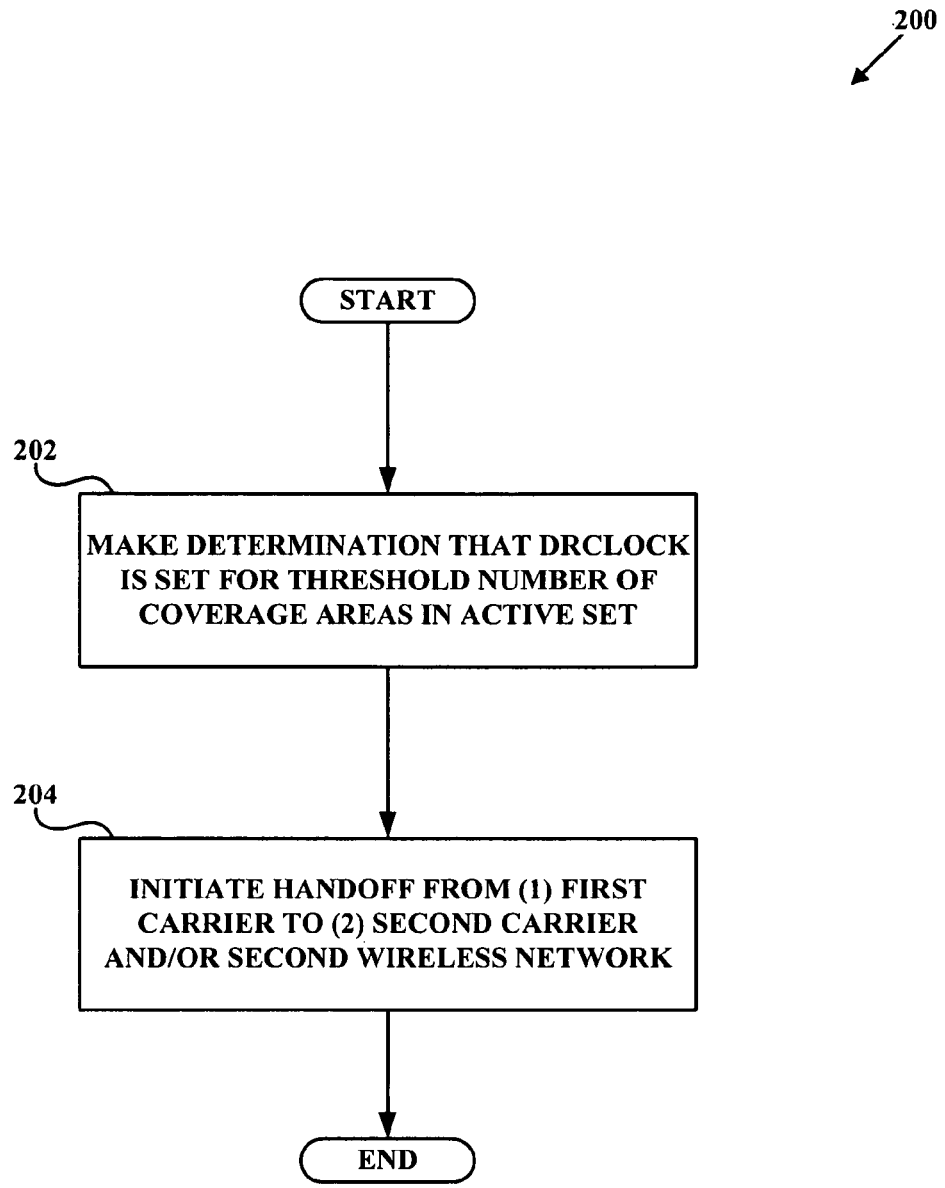
FIG. 2 is a flowchart of a method, in accordance with exemplary embodiments.

FIG. 2 depicts a flowchart of an exemplary method, in accordance with exemplary embodiments. In an exemplary embodiment, as described below in connection with FIG. 2, method 200 may be carried out by an access node, such as access node 105. In another embodiment, method 200 may be carried out by an access terminal, such as access terminal 102. In other embodiments, the method may be carried out by another network entity mentioned herein, such as BTS 103, RNC 104, PDSN 106, some other network entity, or some combination thereof.

As shown in FIG. 2, method 200 begins at step 202 where access node 105 makes a determination that a DRCLock is set for at least a threshold number of coverage areas in an active set for an access terminal operating on a first carrier in a first wireless network. The access terminal may be, for example, access terminal 102 depicted in FIG. 1. In an exemplary embodiment, each coverage area may be sector, and/or the first wireless network may be an EV-DO network. However, those having skill in the art will recognize that the first wireless network may be any network capable of supporting the methods and apparatuses described herein, and will recognize that the coverage areas do not have to be sectors.

In an exemplary embodiment, the threshold number could be a percentage. For example, the threshold number may be 50%. In this example, if there are six coverage areas in the active set for access terminal 102, step 202 may involve making a determination that three of the coverage areas have a DRCLock set for the access terminal 102. If there were only four coverage areas in the active set for access terminal 102, then step 202 may involve access node 105 making a determination that two of the coverage areas have a DRCLock set for access terminal 102.

In another exemplary embodiment, the threshold number could be a fixed number. For example, the threshold number may be three. In this example, whether there are four, seven, or some other number of coverage areas in an active set for access terminal 102, access node 105 may make an affirmative determination in step 202 if three of the coverage areas have a DRCLock set for access terminal 102.

In another embodiment, the threshold number may be the total number of coverage areas in the active set less a fixed number. For example, the fixed number may be two. In this example, if there are four coverage areas in an active set for access terminal 102, then the threshold number would be two. Alternatively, if there are seven coverage areas in the active set for access terminal 102, then the threshold number would be five. In this exemplary embodiment, the threshold number is set such that access node 105 will not make an affirmative determination in step 202 if more than the fixed number of coverage areas do not have a DRCLock set.

The threshold number may be determined by access node 105, by access terminal 102, by any other access node or access terminal, or by any other entity, regardless of which entity makes the determination in step 202. The access node or other entity may monitor network conditions and alter the threshold number as required. Those having skill in the art will recognize that the described threshold numbers are exemplary in nature and that any threshold number suitable for use in the described methods and apparatuses may be used. Any absolute number, any relative number, any other number, percentage, ratio, etc., or any combination thereof may be used.

At step 204, in response to making the determination at step 202, access node 105 initiates a handoff of access terminal 102 from the first carrier to at least one of (a) a second carrier and (b) a second wireless network. In an exemplary embodiment, step 204 may comprise initiating a handoff of access terminal 102 from the first carrier to a second carrier in the first wireless network. Access terminal 102 could even, but would not necessarily, retain the same active set (i.e., a corresponding active set on another carrier) of coverage areas, but after the handoff, may communicate with the same coverage areas on a different carrier. Those having skill in the art will recognize that the preceding explanations are exemplary in nature, and that the active set of coverage areas for access terminal 102 may have any combination of existing or new coverage areas after a handoff.

In another exemplary embodiment, initiating the handoff may comprise initiating a handoff of access terminal 102 from the first carrier in the first wireless network to a second carrier in a second wireless network. In an embodiment, access terminal 102 may be a dual-mode access terminal capable of receiving service from, for example, an EV-DO network, a CDMA network, a WiMAX network, and/or any other network or combination of networks. The second wireless network may comprise, for example, a CDMA network and/or a WiMAX network.

In an exemplary embodiment, initiating the handoff may comprise initiating a handoff of access terminal 102 from the first wireless network to a second wireless network. For example, the second wireless network may be a Wi-Fi network. Those having skill in the art will recognize that the preceding explanations are exemplary in nature, and that the second network may be any suitable network for receiving a handoff of the access terminal.

The invention claimed is:

1. A method carried out by at least one network entity, the at least one network entity comprising a wireless-communication interface, a processor, and data storage comprising instructions executable by the processor, the method comprising:

the at least one network entity making a determination that a DRCLock is set for at least a threshold number of coverage areas in an active set for an access terminal operating on a first carrier in a first wireless network, wherein the DRCLock being set for a given coverage area at a given time indicates that the respective coverage area is not at the given time an option for providing forward-link service to the access terminal; and the at least one network entity, in response to making the determination, initiating a handoff of the access terminal from the first carrier to at least one of (a) a second carrier and (b) a second wireless network.

2. The method of claim 1, wherein the threshold number is a percentage.

3. The method of claim 1, wherein the threshold number is a fixed number.

4. The method of claim 1, wherein the threshold number is a total number of coverage areas in the active set less a fixed number.

5. The method of claim 1, wherein each coverage area is a sector.

6. The method of claim 1, wherein the first wireless network comprises an EV-DO network.

7. The method of claim 1, wherein initiating a handoff of the access terminal from the first carrier to at least one of (a) a second carrier and (b) a second wireless network comprises initiating a handoff of the access terminal from the first carrier to a second carrier in the first wireless network.

8. The method of claim 1, wherein initiating a handoff of the access terminal from the first carrier to at least one of (a) a second carrier and (b) a second wireless network comprises initiating a handoff of the access terminal from the first carrier in the first wireless network to a second carrier in a second wireless network.

9. The method of claim 8, wherein the second wireless network comprises a CDMA network.

10. The method of claim 8, wherein the second wireless network comprises a WiMAX network.

11. The method of claim 1, wherein initiating a handoff of the access terminal from the first carrier to at least one of (a) a second carrier and (b) a second wireless network comprises initiating a handoff of the access terminal from the first wireless network to a second wireless network.

12. The method of claim 11, wherein the second wireless network comprises a Wi-Fi network.

13. An access node comprising:
a wireless-communication interface;

a processor; and data storage comprising instructions executable by the processor for:

making a determination that a DRCLock is set for at least a threshold number of coverage areas in an active set for an access terminal operating on a first carrier in a first wireless network, wherein the DRCLock being set for a given coverage area at a given time indicates that the respective coverage area is not at the given time an option for providing forward-link service to the access terminal; and in response to making the determination, initiating a handoff of the access terminal from the first carrier to at least one of (a) a second carrier and (b) a second wireless network.

14. The access node of claim 13, wherein each coverage area is a sector.

15. The access node of claim 13, wherein the first wireless network comprises an EV-DO network.

16. The access node of claim 13, wherein the instructions for initiating a handoff of the access terminal from the first carrier to at least one of (a) a second carrier and (b) a second wireless network comprise instructions for initiating a handoff of the access terminal from the first carrier to a second carrier in the first wireless network.

17. The access node of claim 13, wherein the instructions for initiating a handoff of the access terminal from the first carrier to at least one of (a) a second carrier and (b) a second wireless network comprise instructions for initiating a handoff of the access terminal from the first carrier in the first wireless network to a second carrier in a second wireless network.

18. The access node of claim 13, wherein the instructions for initiating a handoff of the access terminal from the first carrier to at least one of (a) a second carrier and (b) a second wireless network comprise instructions for initiating a handoff of the access terminal from the first wireless network to a second wireless network.

19. An access terminal comprising:

a wireless-communication interface;

a processor; and data storage comprising instructions executable by the processor for:

making a determination that a DRCLock is set for at least a threshold number of coverage areas in an active set for the access terminal operating on a first carrier in a first wireless network, wherein the DRCLock being set for a given coverage area at a given time indicates that the respective coverage area is not at the given time an option for providing forward-link service to the access terminal; and in response to making the determination, initiating a handoff of the access terminal from the first carrier to at least one of (a) a second carrier and (b) a second wireless network.

20. The access terminal of claim 19, wherein the first wireless network comprises an EV-DO network.

21. The access terminal of claim 19, wherein the instructions for initiating a handoff of the access terminal from the first carrier to at least one of (a) a second carrier and (b) a second wireless network comprise instructions for initiating a handoff of the access terminal from the first carrier to a second carrier in the first wireless network.

22. The access terminal of claim 19, wherein the instructions for initiating a handoff of the access terminal from the first carrier to at least one of (a) a second carrier and (b) a second wireless network comprise instructions for initiating a handoff of the access terminal from the first carrier in the first wireless network to a second carrier in a second wireless network.

23. The access terminal of claim 19, wherein the instructions for initiating a handoff of the access terminal from the first carrier to at least one of (a) a second carrier and (b) a second wireless network comprise instructions for initiating a handoff of the access terminal from the first wireless network to a second wireless network.

24. The method of claim 1, wherein the threshold number is three.

25. The access node of claim 13, wherein the threshold number is three.

26. The access terminal of claim 19, wherein the threshold number is three.

* * * * *